Figure 1:
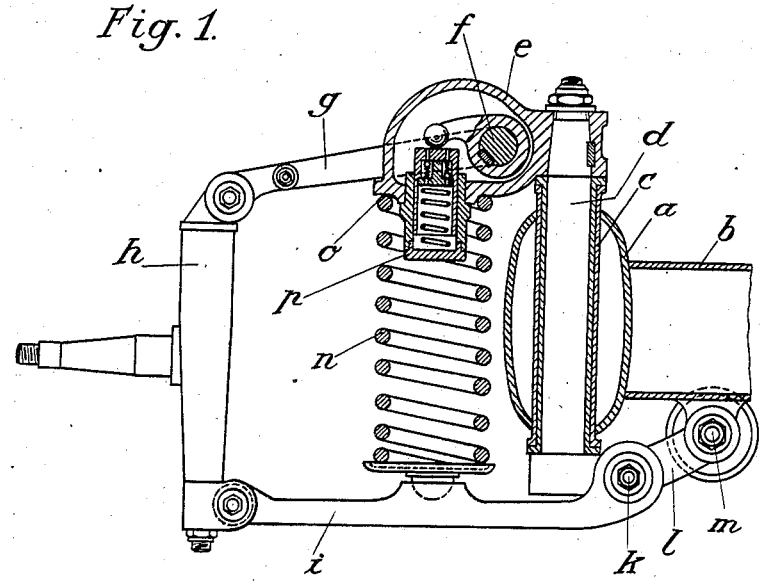

June 6, 1944.   M. WAGNER   2,350,848
WHEEL SUSPENSION FOR VEHICLES
Filed Oct. 15, 1941

INVENTOR
Max Wagner
BY A. A. Dicke
ATTORNEY

Patented June 6, 1944

2,350,848

UNITED STATES PATENT OFFICE 2,350,848

WHEEL SUSPENSION FOR VEHICLES

Max Wagner, Stuttgart, Germany; vested in the Alien Property Custodian

Application October 15, 1941, Serial No. 415,007
In Germany November 18, 1939

1 Claim. (Cl. 267—20)

This invention relates to improvements in wheel suspensions wherein two pivoted links are arranged one above the other and carry the steering swivel pin of the vehicle wheel, and an unguided helical spring is arranged to cushion the vehicle wheel.

One object of the invention is the arrangement of the unguided helical spring between the links in position to support one of the links and cooperate with a shock absorber coacting with the other link.

Another object of the invention is the production of a very simple and economical supporting device for the wheel supporting system wherein springing of the wheel is secured and distortion stresses ordinarily produced by lateral derangement of the spring supports, is avoided.

A further object of the invention is the arrangement of a shock absorber in the wheel springing system in position to properly function as a shock absorber and simultaneously provide a support for one end of the unguided helical spring.

Other objects and advantages will be apparent from the following description wherein reference is made to the accompanying drawing illustrating preferred embodiments of the invention.

Figure 2:
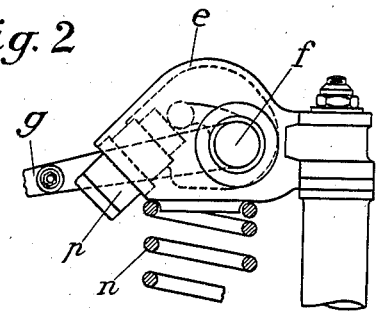

In the drawing:

Fig. 1 is a vertical section through a springing wheel suspension for a steering wheel, and Fig. 2 is a detail elevation, with parts in section, of a modified arrangement of the shock absorber.

In the drawing, $a$ represents a vertical tubular frame side member of a vehicle, $b$ a cross member, likewise of tubular form and which connects together the two lateral frame members $a$. In a tubular sleeve $c$ vertically passing through the frame side member $a$ at the point of connection between the latter and the cross member, is disposed a trunnion $d$ mounted for oscillation about a vertical axis. At the top of the trunnion above the frame side member is fixed casing $e$ of a shock absorber or damper, for instance of a dashpot type shock absorber. The shock absorber extends beyond the frame side member and eccentrically with respect to the oscillation axis of the trunnion. In the casing of the shock absorber is journalled—by means of a bolt $f$ passing horizontally therethrough—an upper link $g$ for a wheel bearing member $h$ carrying the steering swivel pin of the wheel. The lower link $i$ for guiding the wheel is mounted on the underside of the vertical trunnion by means of the pivot $k$.

An arm $l$ on the trunnion carries a pin $m$ disposed centrally within rubber buffers mounted on the cross member $b$, thereby elastically supporting the trunnion $d$ for oscillations about its vertical axis.

The springing of the wheel is accomplished by means of an unguided helical spring $n$, which, by its lower end directly or, as shown, by insertion of a bearing support having a ball joint, bears against the lower guiding link $i$ and by its upper end against a collar $o$ formed on the casing $e$ of the shock absorber. The ends of the spring are secured against lateral displacement.

In the embodiment of Fig. 1 the cylinder $p$ of the shock absorber screwed into the casing $e$ serves simultaneously for securing the upper end of the helical spring $n$ against lateral displacement, and encases spring $r$ which normally maintains the shock absorber piston $s$ in raised position contacting the arm $t$ fixed upon the bolt $f$.

In the embodiment of Fig. 2 however, the damping cylinder $p$ is arranged outside the helical spring $n$, so that the cylinder surrounding the damping piston may be removed and replaced independently of dismounting the helical spring $n$.

What I claim as my invention and desire to protect by Letters Patent is:

A wheel suspension for vehicles, comprising a wheel, frame members, two guiding members for the wheel mounted one above the other, a trunnion passing through one of said frame members, a shock absorber casing supporting one guiding member and mounted on the top of the trunnion eccentrically with respect to the latter, a spring mounted vertically and laterally with respect to the frame member and abutting with the one end against the lower guiding member and by the other end against the shock absorber casing mounted vertically above the lower supporting surface of the spring.

MAX WAGNER.